United States Patent
Hirahara (10) Patent No.: US 8,004,534 B2
(45) Date of Patent: Aug. 23, 2011

(54) GRAPHICS PROCESSING METHOD, GRAPHICS PROCESSOR AND VIDEO REPRODUCING APPARATUS

(75) Inventor: Takashi Hirahara, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 622 days.

(21) Appl. No.: 12/163,207

(22) Filed: Jun. 27, 2008

(65) Prior Publication Data

US 2009/0002382 A1    Jan. 1, 2009

(30) Foreign Application Priority Data

Jun. 29, 2007   (JP) ................................ 2007-173270

(51) Int. Cl.
*G06T 1/00*    (2006.01)
*G06T 15/00*   (2011.01)
*G06F 15/00*   (2006.01)
(52) U.S. Cl. ........................................ 345/522; 345/501
(58) Field of Classification Search .................. None
See application file for complete search history.

(56) References Cited

U.S. PATENT DOCUMENTS

2005/0116946 A1* 6/2005 Chung ......................... 345/418

FOREIGN PATENT DOCUMENTS

JP           07-244572 A     9/1995

* cited by examiner

*Primary Examiner* — Kee M Tung
*Assistant Examiner* — Jacinta Crawford
(74) *Attorney, Agent, or Firm* — Pillsbury Winthrop Shaw Pittman LLP (57) ABSTRACT

According to one embodiment, a graphics processor includes a decode request registering module which registers decode requests for image data items sequentially, a decode processing module which decodes and holds the image data items in a registration order of the decode requests, and a drawing module which acquires a decode result from the decode processing module according to a drawing request issued for each image data item and drawing the decode result. The registering module notifies an external device that a waiting state for the drawing request for the image data item has been established, in response to registration of the decode request for the image data item to ensure that the preparation of the drawing request for the image data item is performed in parallel with the decoding of the image data item.

10 Claims, 11 Drawing Sheets

GRAPHICS PROCESSING METHOD, GRAPHICS PROCESSOR AND VIDEO REPRODUCING APPARATUS

CROSS-REFERENCE TO RELATED APPLICATIONS

This application is based upon and claims the benefit of priority from Japanese Patent Application No. 2007-173270, filed Jun. 29, 2007, the entire contents of which are incorporated herein by reference.

BACKGROUND

1. Field

One embodiment of the present invention relates to a video reproducing apparatus such as a digital video disk (DVD) player and more particularly, to a graphics processing method and graphics processor for generating a graphic object such as figures, characters, and other images in the video reproducing apparatus.

2. Description of the Related Art

In recent years, spreading of the DVD is remarkable and high density DVDs in which content images are recorded in high density have appeared. When a video disk is loaded on the video reproducing apparatus, a graphic object to be displayed as a title or chapter selection menu is generated along with reproduction of a content recorded in the video disk. For example, the image data for the menu is prepared mainly in an image format such as PNG, JPEG, CVI, CDW, MNG and it is decoded in an order specified by content design and then drawn as a graphic object on a graphics plane in the image memory. The graphic object in this graphics plane is output to a display such that it is superimposed on a reproduced image of the content recorded in the video disk.

Figure 13:
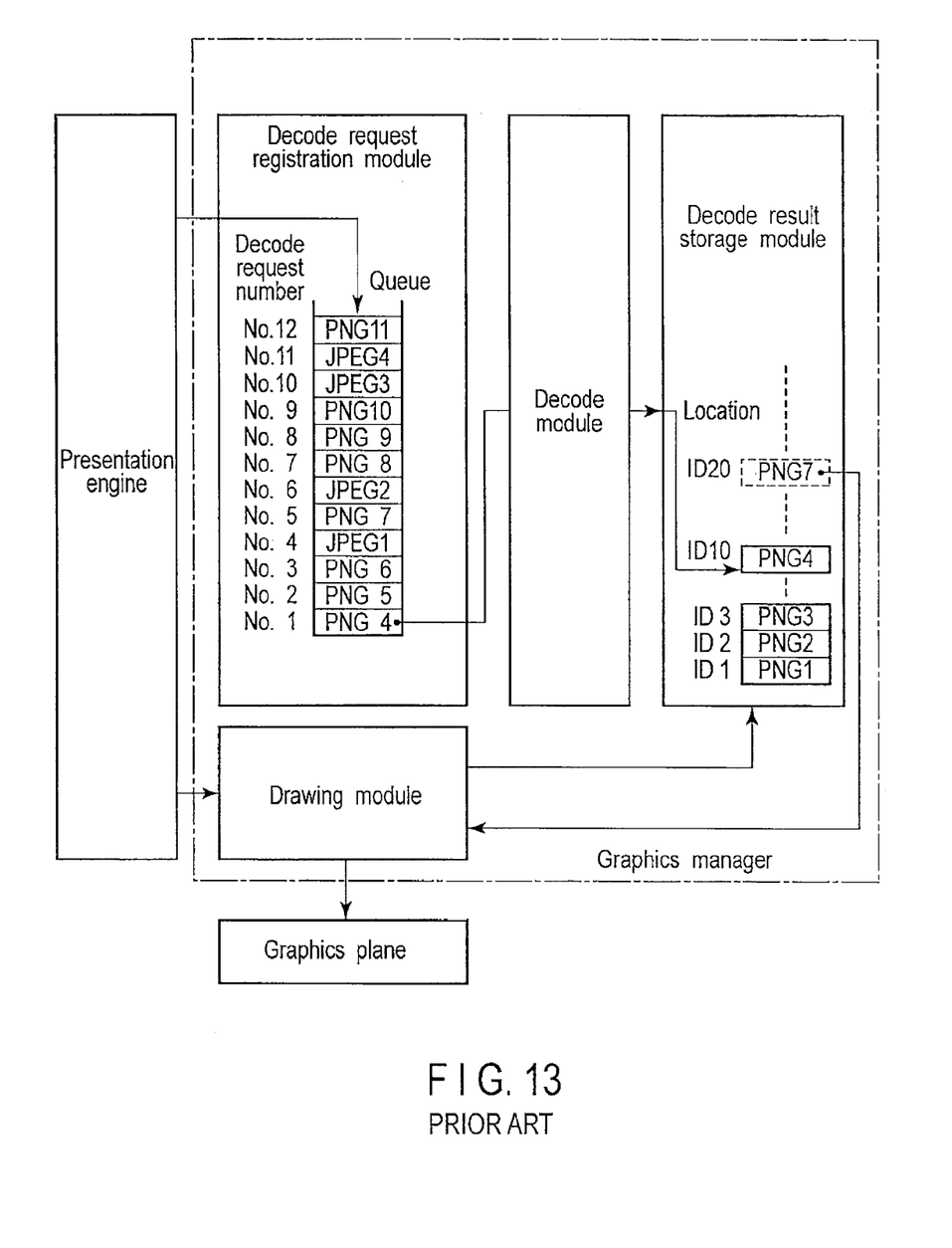
FIG. 13 is an exemplary diagram showing the configuration of the graphics manager of a conventional video reproducing apparatus.

As shown in for example, FIG. 13, a conventional video reproducing apparatus includes a presentation engine which requests for decoding of image data items and drawing thereof and a graphics manager which processes the decode request and the drawing request. The graphics manager includes a decode request registration module, decode module, decode result storage module, drawing module and the like. In the decode request registration module, decode requests for image data items are registered in a queue. The decode module decodes the image data item of each decode request registered in the queue of the decode request registration module and stores a decode result in one of memory locations provided in the decode result storage module. The drawing module extracts a decode result from the decode result storage module according to a drawing request performed for each image data item and draws an image on the graphics plane. Here, the image data items are decoded in the order of the decode requests registered in the queue (see, for example, Jpn. Pat. Appln. KOKAI Publication No. 7-244572).

Although a content designer can set up a display timing of the graphic object, this setting sometimes requests a hardware of the image reproducing apparatus for a high operating speed, so that sometimes the graphic object cannot be displayed at a timing as designed. Further, there is a case in which a necessity of displaying a selection menu occurs upon an operation of a function button provided on the video reproducing apparatus. In this case, if it takes time from the operation of the function button to a display of the selection menu, user embraces a feeling of discomfort to response of the video reproducing apparatus. According to Jpn. Pat. Appln. KOKAI Publication No. 7-244572, identification information of drawing data, that is, decode requests for image data items are registered separately in the priority drawing queue list and non-priority drawing queue list, and the drawing data of the identification information registered in the priority drawing queue list is decoded on a priority basis.

However, although Jpn. Pat. Appln. KOKAI Publication No. 7-244572 accelerates a decode start of the drawing data to be drawn on a priority basis, it is difficult to optimize the priority level of the non-priority drawing queue list with respect to the priority drawing queue list easily. Further, time from a decode start to an end of drawing cannot be shortened effectively.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings.

An embodiment of the present invention provides a graphics processing method comprising: registering decode requests for image data items sequentially; decoding and holding the image data items in a registration order of the decode requests; acquiring a decode result according to a drawing request issued for each image data item; and drawing the decoding result; wherein a drawing request source is notified that a waiting state for the image data drawing request has been established, in response to registration of the decode request for the image data item to ensure that the preparation of the drawing request for the image data item is performed in parallel with the decoding of the image data item.

Another embodiment of the present invention provides a graphics processor comprising: a registering module which registers decode requests for image data items sequentially; a decode processing module which decodes and holds the image data items in a registration order of the decode requests; and a drawing module which acquires a decode result from the decode processing module according to a drawing request issued for each image data item and drawing the decode result; wherein the registering module is configured to notify a drawing request source that a waiting state for the drawing request for the image data item has been established, in response to registration of the decode request for the image data item to ensure that the preparation of the drawing request for the image data item is performed in parallel with the decoding of the image data item.

Still another embodiment of the present invention provides a video reproducing apparatus comprising: a presentation engine which makes decode and drawing requests for image data items, each drawing request being issued after a corresponding decode request is issued; and a graphics manager which registers the decode requests sequentially issued by the presentation engine, decoding and holding the image data items in a registration order of the decode requests and then drawing a decode result as a graphic object according to the drawing request issued for each image data item; wherein the graphics manager notifies the presentation engine that a waiting state for a drawing request for the image data item has been established, in response to registration of the decode request for the image data item to ensure that the preparation of the drawing request for the image data item is performed in parallel with the decoding of the image data item.

With the graphic processing method, the graphics processor and the video reproducing apparatus, the notification that a waiting state for a drawing request for the image data item has been established is issued in response to the registration of the decode request for the image data to thereby ensure that the preparation of the drawing request is performed in parallel with the decoding of the image data item. That is, before the decode result of the image data item is actually acquired, the preparation of the drawing request can be started. Accordingly, time from a start of decoding of the image data item to be drawn to an end of the drawing for the image data item can be shortened effectively without a necessity of any complicated optimizing control.

Hereinafter, the video reproducing apparatus according to an embodiment of the present invention will be described. This video reproducing apparatus is a DVD player for a high density DVD in which, for example, a content video is recorded in a high density.

Figure 1:
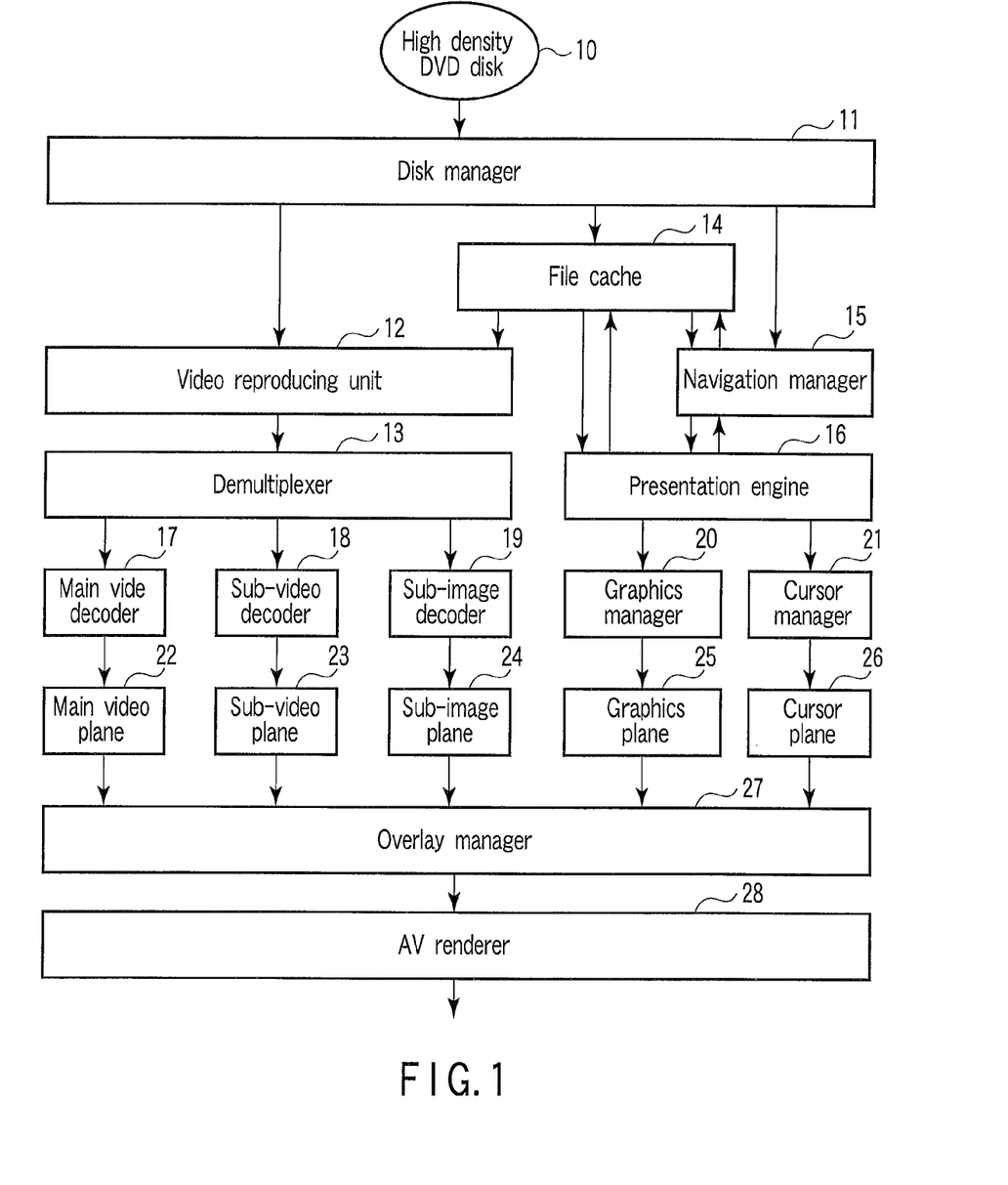
FIG. 1 is an exemplary diagram showing the schematic circuit configuration of a video reproducing apparatus according to an embodiment of the present invention.

FIG. 1 shows the schematic circuit configuration of this video reproducing apparatus. This video reproducing apparatus includes a disk manager 11, a video reproducing unit 12, a demultiplexer 13, a file cache 14, a navigation manager 15, and a presentation engine 16. The disk manager 11 reads out information recorded in the high density DVD 10, supplies video information contained in this recorded information to the video reproducing unit 12 and supplies control information contained in the recorded information to the navigation manager 15. Further, the video information and control information are supplied also to the file cache 14 in order to omit rereading of recorded information and supplies the recorded information upon a request from the video reproducing unit 12, the navigation manager 15, or the presentation engine 16. The video reproducing unit 12 reproduces an effective component of the video information and supplies it to the demultiplexer 13. The reproduction result of the vide reproducing unit 12 is in a multiplexed form of main video data, sub-video data and sub-image data, and the demultiplexer 13 demultiplexes the reproduction result to the main video data, sub-video data and sub-image data. The navigation manager 15 perform a navigation control such as reproduction, stop, forward feeding, reverse feeding, menu display and the like according to an operation at a remote controller. The presentation engine 16 issues a decode request, drawing request and the like for an image data necessary for achieving presentation of a title/chapter selection menu and a function selection menu under the control of the navigation manager 15.

The video reproducing apparatus includes a main video decoder 17, a sub-video decoder 18, a sub-image decoder 19, a graphics manager 20, a cursor manager 21, a main video plane 22, a sub-video plane 23, a sub-image plane 24, a graphics plane 25, a cursor plane 26, an overlay manager 27, and an AV renderer 28. The main video plane 22, the sub-video plane 23, the sub-image plane 24, the graphics plane 25, and the cursor plane 26 are drawing memories which serve as a drawing plane. The main video decoder 17 decodes main video information obtained from the demultiplexer 13 and draws this decode result on the main video plane 22. The sub-video decoder 17 decodes sub-video information obtained from the demultiplexer 13 and draws this decode result on the sub-video plane 23. The sub-image decoder 17 decodes sub-image information obtained from the demultiplexer 13 and draws this decode result on the sub-image plane 24. The graphics manager 20 decodes image data according to a decode request from the presentation engine 16 and draws this decode result onto the graphics plane 25 according to the drawing request as a graphic object such as a figure, character and other image. For example, the image data for a menu is supplied from the presentation engine 16 to the graphics manager 20 in an image format such as PNG, JPEG, CVI, CDW, MNG. The cursor manager 21 decodes cursor image data according to a decode request from the presentation engine 16 and draws a decode result on the cursor plane 26 as a cursor according to the drawing request.

The overlay manager 27 overlays drawing results in the main video plane 22, the sub-video plane 23, the sub-image plane 24, the graphics plane 25 and the cursor plane 26 and supplies an overlaid drawing result to the AV renderer 28. Here, the drawing results are overlaid in the order of the main video plane 22, the sub-video plane 23, the sub-image plane 24, the graphics plane 25 and the cursor plane 26, and the drawing result of upper layer takes a higher priority than the drawing result of lower layer in presentation. The AV renderer 28 outputs the overlaid drawing result to an external video apparatus at a predetermined frame rate.

Figure 2:
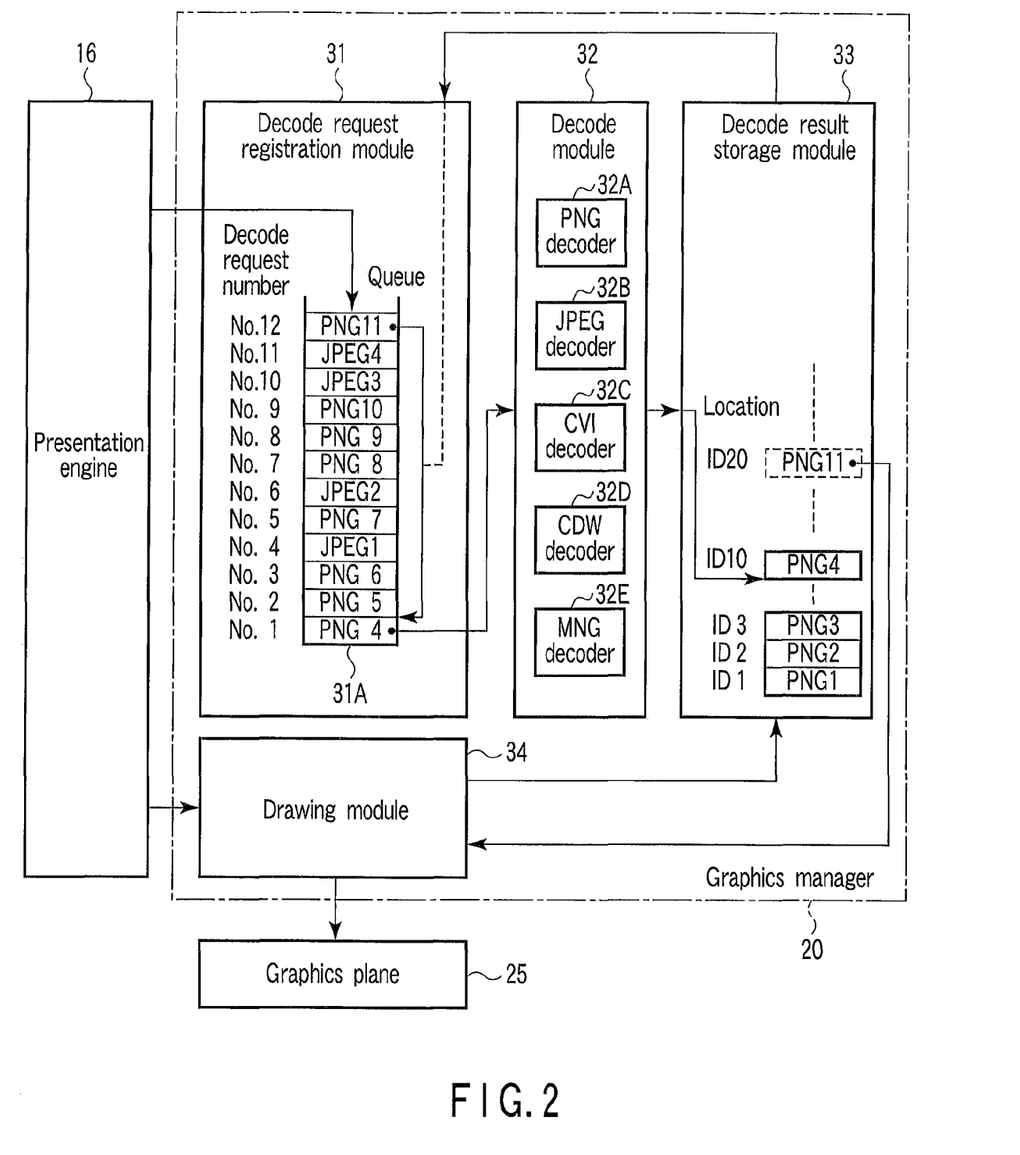
FIG. 2 is an exemplary diagram showing the configuration of a graphics manager shown in FIG. 1 further in detail.

FIG. 2 shows the configuration of the graphics manager 20 in more detail. The graphics manager 20 is a graphics processor IC independent from the presentation engine 16 and includes a decode request registration module 31, a decode module 32, a decode result storage module 33 and a drawing module 34. In the decode request registration module 31, decode requests for image data items supplied from the presentation engine 16 are registered into the queue 31A sequentially. The decode module 32 decodes the image data items in the registration order of the decode requests to the queue 31A of the decode request registration module 31 and stores each decode result into one of the memory locations provided on the decode result storage module 33. The drawing module 34 extracts the decode result from the decode result storage module 33 according to a drawing request issued for each image data item and draws on the graphics plane 25. Here, the decode module 32 and the decode result storage module 33 constitute a decode processing module of decoding and holding the image data items in the registration order of the decode requests.

In response to the registration of a decode request for each image data item, the decode request registration module 31 notifies the presentation engine 16, serving as a drawing request source, that a waiting state for the drawing request for the image data item has been established to the presentation engine 16. This notification contains a storage destination of the decode result, which should be informed of on completion of decoding in an ordinary case.

Although the decode request from the presentation engine 16 may contain the image data item and identification information of the image data item, the queue 31A does not need to store the image data item and identification information of the image data item, and is configured to store the location of the image data item stored in the file cache 14 as the identification information. Each time when image data is requested by the decode module 32, the decode request registration module 31 takes out an image data item corresponding to a decode request held at a head position of the queue 31A (that is, identification information) from the file cache 14 and outputs the image data item to the decode module 32 together with a storage destination for the decode result. The decode request for the image data item output to the decode module 32 is deleted from the queue 31A. The decode module 32, as shown in FIG. 2, includes PNG decoder 32A, JPEG decoder 32B, CVI decoder 32C, CDW decoder 32D and MNG decoder 32E. These PNG decoder 32A, JPEG decoder 32B, CVI decoder 32C, CDW decoder 32D and MNG decoder 32E are used to decode image data items supplied in the image formats of PNG, JPEG, CVI, CDW, and MNG, respectively. The decode module 32 decodes each image data item using a corresponding one of the decoders 32A-32E and, decodes the next image data item after a decode result has been obtained. The decode module 32 specifies a decode result storage destination and causes a decode result to be stored in a memory location of the decode result storage module 33, which serves as the storage destination.

A drawing request from the presentation engine 16 contains a decode result storage destination, and two-dimensional coordinates (X, Y), a height (H) and a width (W) of a graphic object. The drawing module 34 specifies the decode result storage destination and requests the decode result storage module 33 to read out a decode result of an image data item from the storage destination, and then draws the decode result obtained from the decode result storage module 33 on the graphics plane 25 as the graphic object of the two-dimensional coordinates (X, Y), height (H) and width (W). If decoding of the image data item has not been completed, the drawing module 34 notifies the decode result storage module 33 of a priority request in order to give a higher priority to decoding of the image data item. Along with this, the decode result storage module 33 reconfirms that decoding of the image data has not been completed and notifies the decode request registration module 31 of this priority request. In response to the priority request from the decode result storage module 33, the decode request registration module 31 confirms a position where the decode request for the image data item is registered, and moves the decode request to an upper level in the queue 31A, for example, a head position, so that the image data item can be decoded on a priority basis.

Figure 3:
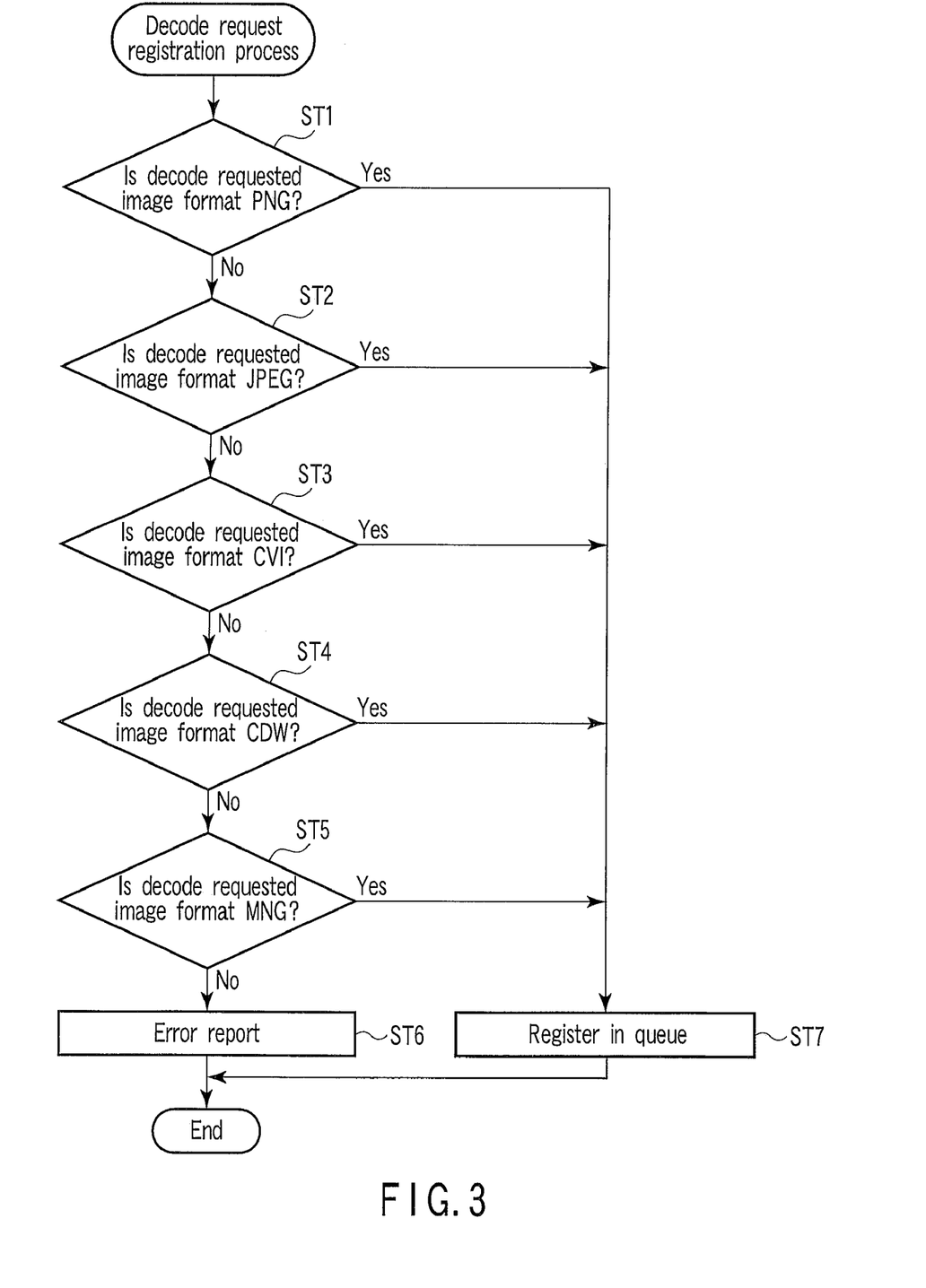
FIG. 3 is an exemplary diagram showing a decode request registration process of the decode request registration module shown in FIG. 2.

FIG. 3 shows a decode request registration process of the decode request registration module 31. In this decode request registration process, it is checked in steps ST1-ST5 whether the decode requested image format is any one of PNG, JPEG, CVI, CDW and MNG, and if the format is not any one of them, an error report is issued in ST6. On the other hand, if the format is one of them, the decode request is registered in the queue 31 in step ST7. The above decode request registration process is performed each time when a decode request for an image data item is issued from the presentation engine 16.

Figure 4:
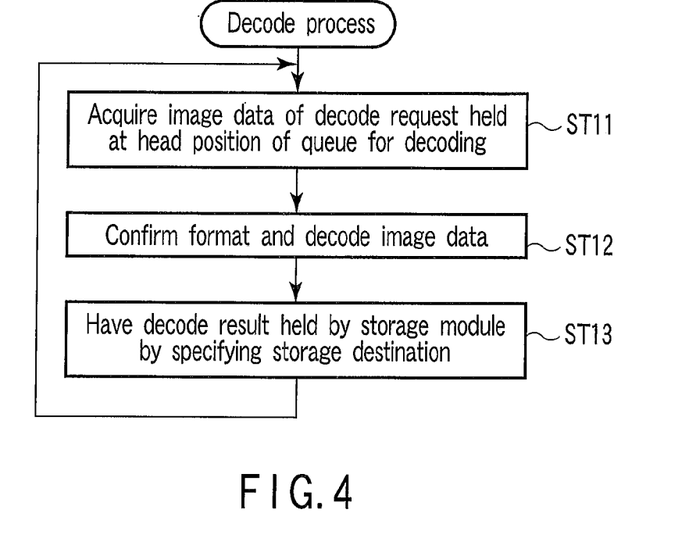
FIG. 4 is an exemplary diagram showing a decode process of the decode module shown in FIG. 2.

FIG. 4 shows a decode process of the decode module 32. In this decode process, the decode module 32 acquires an image data item of a decode request held at the head position in the queue 31A for decoding in step ST11, confirms the image format of the image data item and decodes the image data item in step ST12, and stores a decode result in the decode result storage module 33 by specifying a storage destination in step ST13. This decode process is repeated each time when a decode request for an image data item is registered in the queue 31A.

Figure 5:
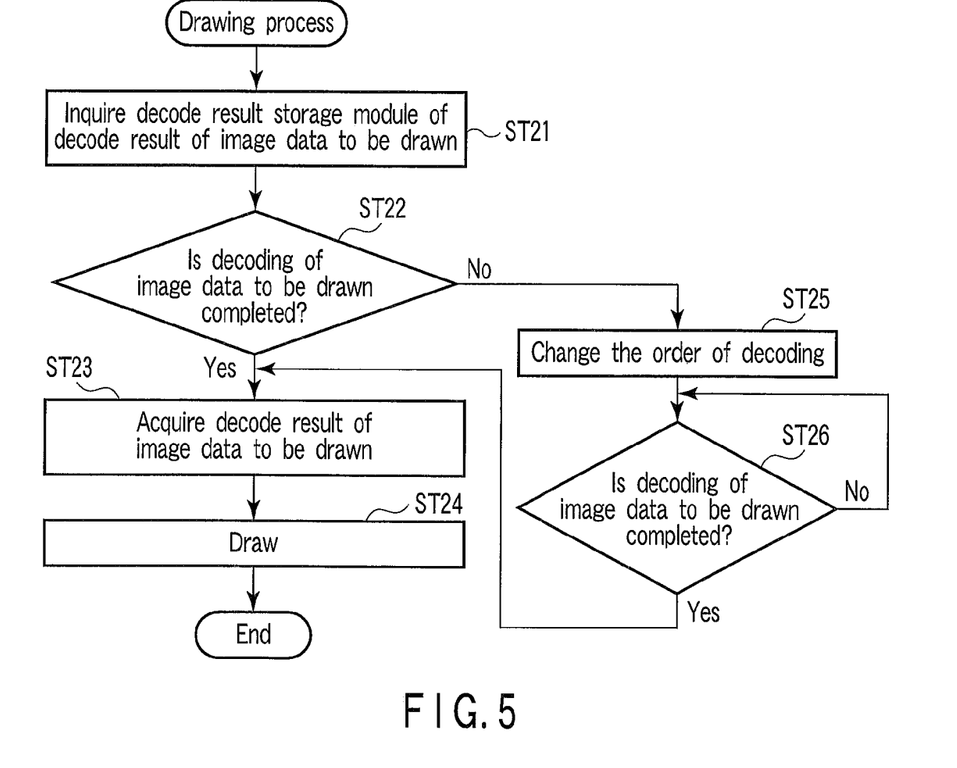
FIG. 5 is an exemplary diagram showing a drawing process of the drawing module shown in FIG. 2.

FIG. 5 shows a drawing process of the drawing module 34. In this drawing process, the drawing module 34 inquires the decode result storage module 33 of a decode result of the image data item to be drawn in step ST21, and checks in step ST22 whether decoding of the image data item to be drawn is completed. If it is confirmed that the decoding has been completed, the drawing module 34 acquires the decode result in step ST23 and draws an image in step ST24. If it is confirmed that the decoding has not been completed in step ST22, the drawing module 34 makes a priority request for the image data item in step ST25 so as to change the order of decoding and rechecks in step ST26 whether decoding of the image data item to be drawn is completed. Step ST26 is repeated until the decoding has been completed. That is, the drawing module 34 waits for completion of decoding by repeating step ST26. After it is confirmed that the decoding has been completed, the drawing module 34 executes step ST23 to acquire this decode result. This drawing process is performed each time when a drawing request for an image data item is issued from the presentation engine 16.

Figure 6:
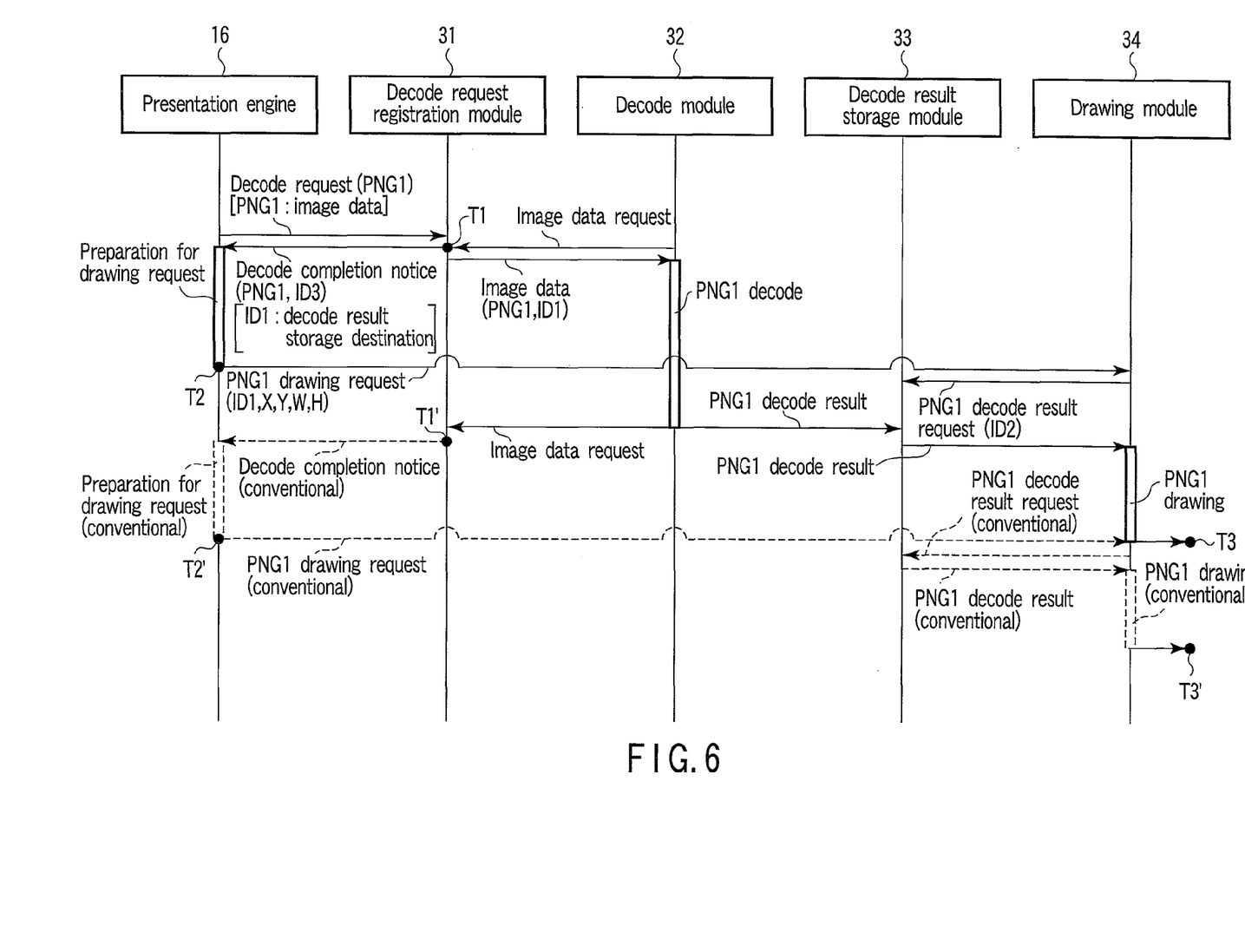
FIG. 6 is an exemplary diagram showing an operation of a graphics manager performed when a single graphics object is drawn under the control of a presentation engine shown in FIG. 2.

FIG. 6 shows an operation of a graphics manager performed when a single graphics object is drawn under the control of the presentation engine 16. When the presentation engine 16 outputs a decode request of PNG1 (image data) to the decode request registration module 31, the decode request registration module 31 responds to registration of the decode request of the PNG1 and notifies the presentation engine 16 that a waiting state for a drawing request of the PNG1 has been established by issuing a decode completion notice (wherein, actual decoding has not been completed) at time T1 in order to ensure that the preparation of the drawing request is performed in parallel with the decoding. The presentation engine 16 performs preparation of the PNG1 drawing request from time T1. When the decode module 32 issues an image data request later than time T1, the decode request registration module 31 outputs the PNG1 to the decode module 32, together with ID1 which designates a storage destination for the decode result of the PNG1. Subsequently, the decode module 32 decodes the PNG1. Usually, the preparation period of the drawing request is shorter than this decoding period and the drawing request of the PNG1, that is, the aforementioned ID1, X, Y, H, W is output from the presentation engine 16 to the drawing module 34 at time T2. In response to the drawing request, the drawing module 34 requests the decode result storage module 33 for the decode result of the PNG1 by specifying ID1 and waits for the decoding to be completed. After the decoding is completed, the decode module 32 sets the decode result of the PNG1 at the storage destination ID1 in the decode result storage module 33. Along with this, the decode result storage module 33 reads out the decode result and outputs it to the drawing module 34. The drawing module 34 draws the decode result on the graphics plane 25 as a graphic object of coordinate X, coordinate Y, height H and width W according to the drawing request of the PNG1, so that it can be output to the overlay manager 27 at time T3.

If the aforementioned decode completion notice is output from the decode request registration module 31 to the presentation engine 16 at time T1' subsequent to the actual completion of decoding in a conventional manner, the presentation engine 16 outputs the drawing request of the PNG1 at time T2'. In response to the drawing request, the drawing module 34 requests the decode result storage module 33 for the decode result of the PNG1. At this time, the decode result of the PNG1 is already held at the storage destination ID1 in the decode result storage module 33. Although the drawing module 34 can acquire the decode result of the PNG1 without waiting, the drawing of this decode result is completed at time T3' which is later than time T3. That is, time from the start of decoding to the completion of drawing can be reduced effectively by notifying the presentation engine 16 that the waiting state for a drawing request of the PNG1 has been established, in response to registration of the decode request of the PNG1.

Figure 7:
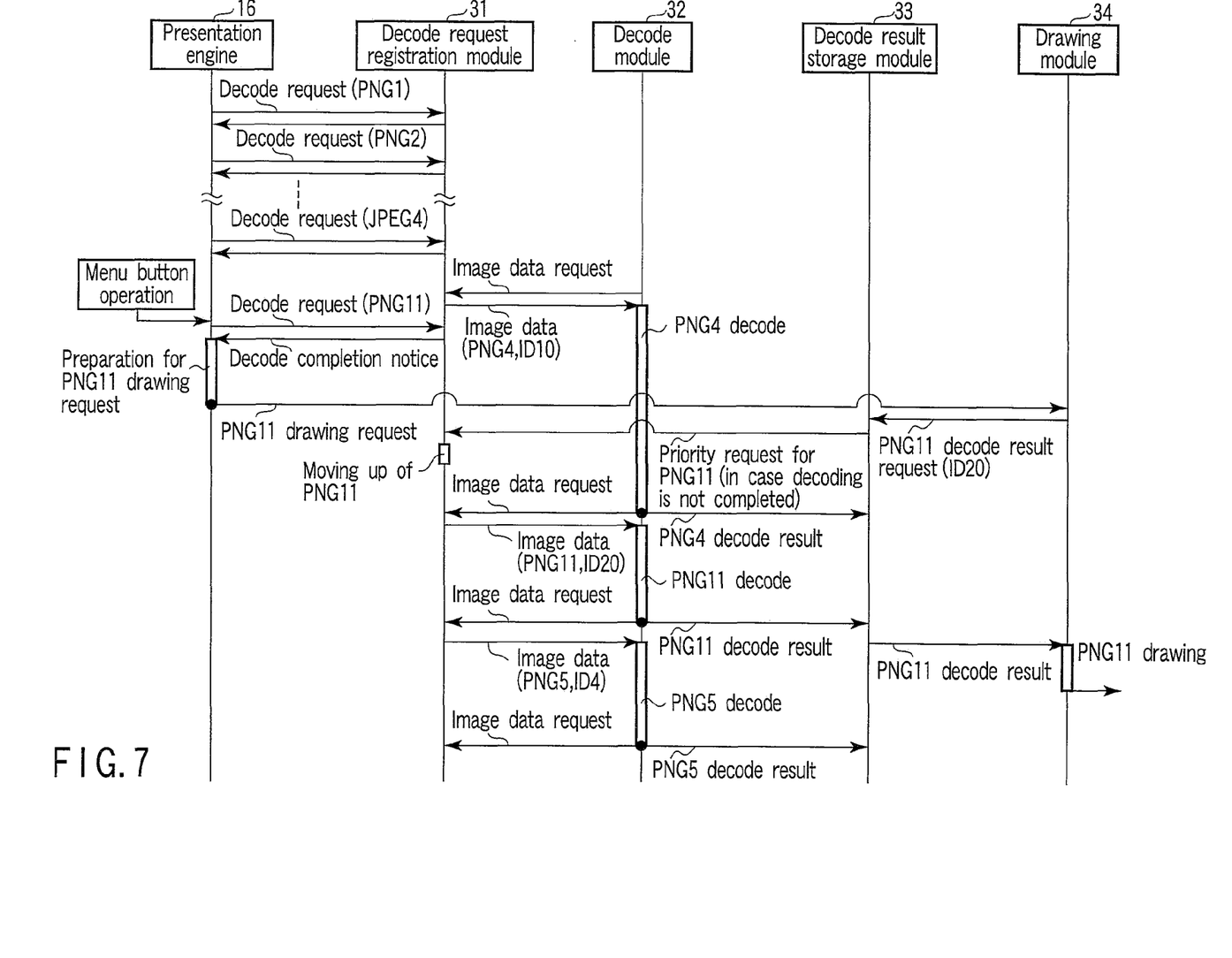
FIG. 7 is an exemplary diagram showing an operation of the graphics manager performed when a specific graphics object is drawn on a priority basis under the control of the presentation engine shown in FIG. 2.

FIG. 7 shows an operation of the graphics manager 20 performed when a specified graphic object is drawn on a priority basis under the control of the presentation engine 16. Here, assume that a menu button operation is carried out immediately after decode requests indicated by decode request numbers "1"-"11" in FIG. 2 are issued sequentially. This menu button operation is detected by the navigation manager 15 shown in FIG. 1, and the navigation manager 15 causes the presentation engine 16 to issue a decode request of PNG11, which is image data representing a menu image. If the decode request of the PNG11 is output to the decode request registration module 31, it is registered in the queue 31A as the decode request number "12". At this time, decoding of the PNG4 of the decode request registered in the queue 31A as an initial decode request number "1" may be started. If the drawing of the PNG11 is placed at the highest priority, the presentation engine 16 responds to a decode completion notice obtained from the decode request registration module 31 immediately after the decode request of the PNG11 is issued and prepares for a drawing request of the PNG11, and then outputs the drawing request of the PNG11 to the drawing module 34 prior to the PNG4 drawing request. Even if the drawing module 34 requests for a decode result of the PNG11 in response to the drawing request, that decode result is not readily obtainable because the registration place of the decode request of the PNG11 is the last one. For the reason, the drawing module 34 notifies the decode result storage module 33 of a priority request in order to give a higher priority to decoding of the PNG11. Along with this, the decode result storage module 33 reconfirms that the decoding of the PNG11 has not been yet completed and notifies the decode request registration module 31 of this priority request. The decode request registration module 31 confirms a registration place of the decode request of the PNG11 in response to the priority request from the decode result storage module 33 and moves up the registration place, so that the PNG11 can be decoded on a priority basis. More specifically, the decode request of the PNG11 is moved to a head position of the queue 31A. When the decode module 32 requests for the next image data upon completion of the decoding of the PNG 4, the decode request registration module 31 outputs the PNG11 to the decode module 32. After that, the decode module 32 decodes the PNG11 and sets up the decode result in the decode result storage module 33. The decode result is sent from the decode result storage module 33 to the drawing module 34 and drawn on the graphics plane 25 by the drawing module 34. As described above, if a specific image data needs to be drawn on a priority basis, a drawing request for the image data is issued prior to the drawing request of other image data already requested to be decoded so as to move up the registration place of the decode request for this image data. Consequently, a waiting time necessary for decoding already requested other image data can be omitted to obtain its decode result.

Figure 8:
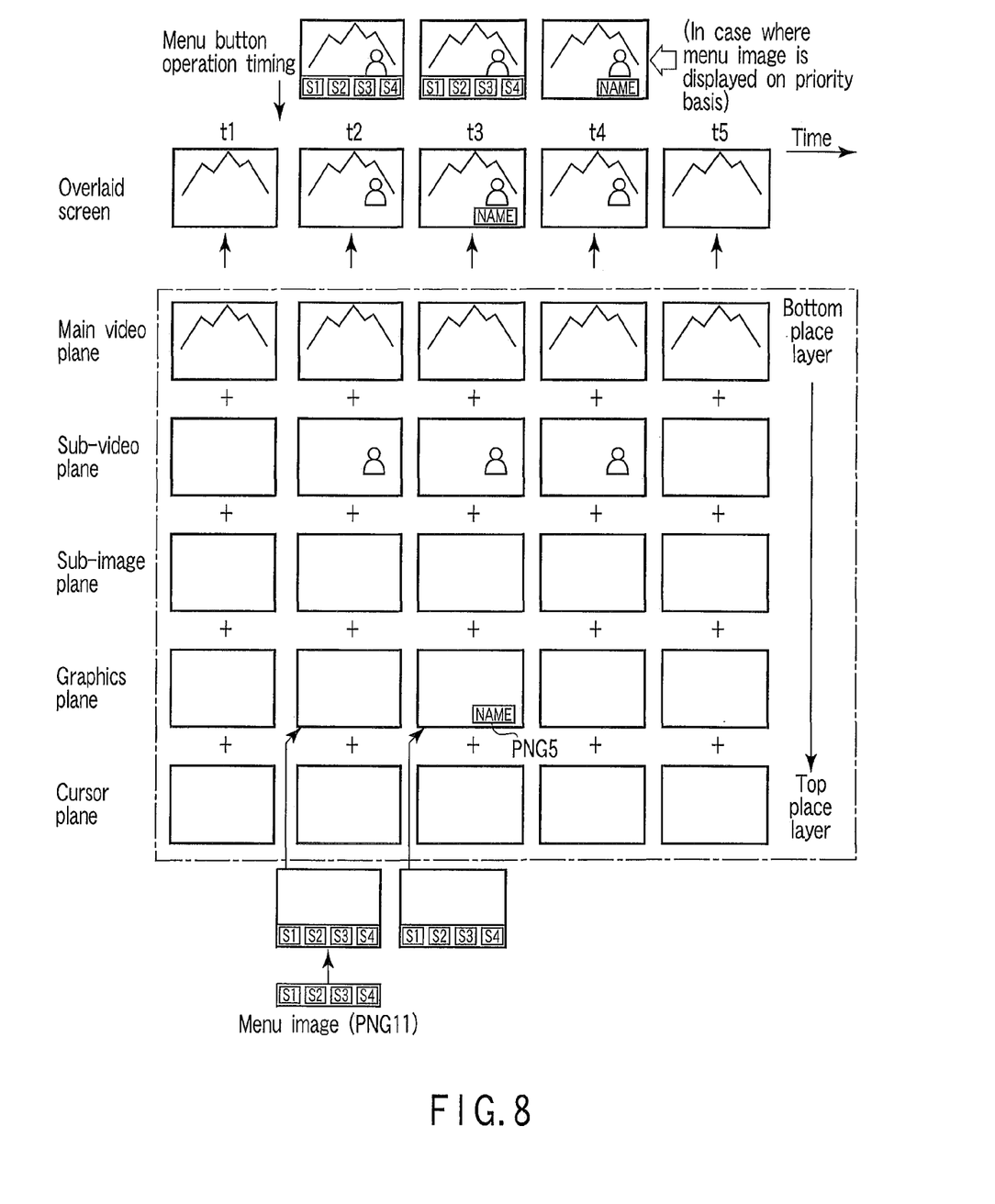
FIG. 8 is an exemplary diagram showing changes in video stream generated when a menu image is displayed on a priority basis in the video reproducing apparatus shown in FIG. 1.

FIG. 8 shows changes in video stream generated when a menu image is displayed on a priority basis in the video reproducing apparatus. In the overlaid screen shown in FIG. 8, an image is obtained as a result of overlaying images drawn on each of the main video plane 22, the sub-video plane 23, the sub-video plane 24, the graphics plane 25 and the cursor plane 26 from the bottom place layer toward the top place layer. Although the menu image is preferred to be displayed in the next frame presented immediately after a menu button operation, this is difficult to do in a case where the registration place for the PNG11 is not changed. Thus, as described above, the change is made by moving up the registration place, so that the PNG11 can be drawn on a priority basis and incorporated into an overlaid image. That is, it is possible to reduce the delay in the display timing of the PNG11 for the menu image with respect to the timing of the menu button operation.

According to the embodiment, the decode request registration module 31 responds to registration of a decode request for an image data item and notifies the presentation engine 16 that the waiting state for a drawing request for the image data item has been established, to ensure that the preparation of the drawing request is performed in parallel with the decoding of the image data item. That is, the preparation of the drawing request can be started before an actual decode result of the image data is obtained. Thus, time necessary from the start of the decoding of an image data item to be drawn to the completion of the drawing of the image data item can be reduced effectively without a necessity of any complicated optimizing control.

If a specific image data item needs to be drawn on a priority basis, a decode result for the specific image data item can be obtained without waiting for the completion of the decoding of other image data items already requested to be decoded, by moving up the registration place of the decode request for the image data item to make a drawing request for the image data item prior to drawing requests for the other image data items. Thus, the time necessary from the start of the decoding of the image data item to be drawn on a priority basis to the completion of the drawing of the image data item can be reduced effectively.

Figure 9:
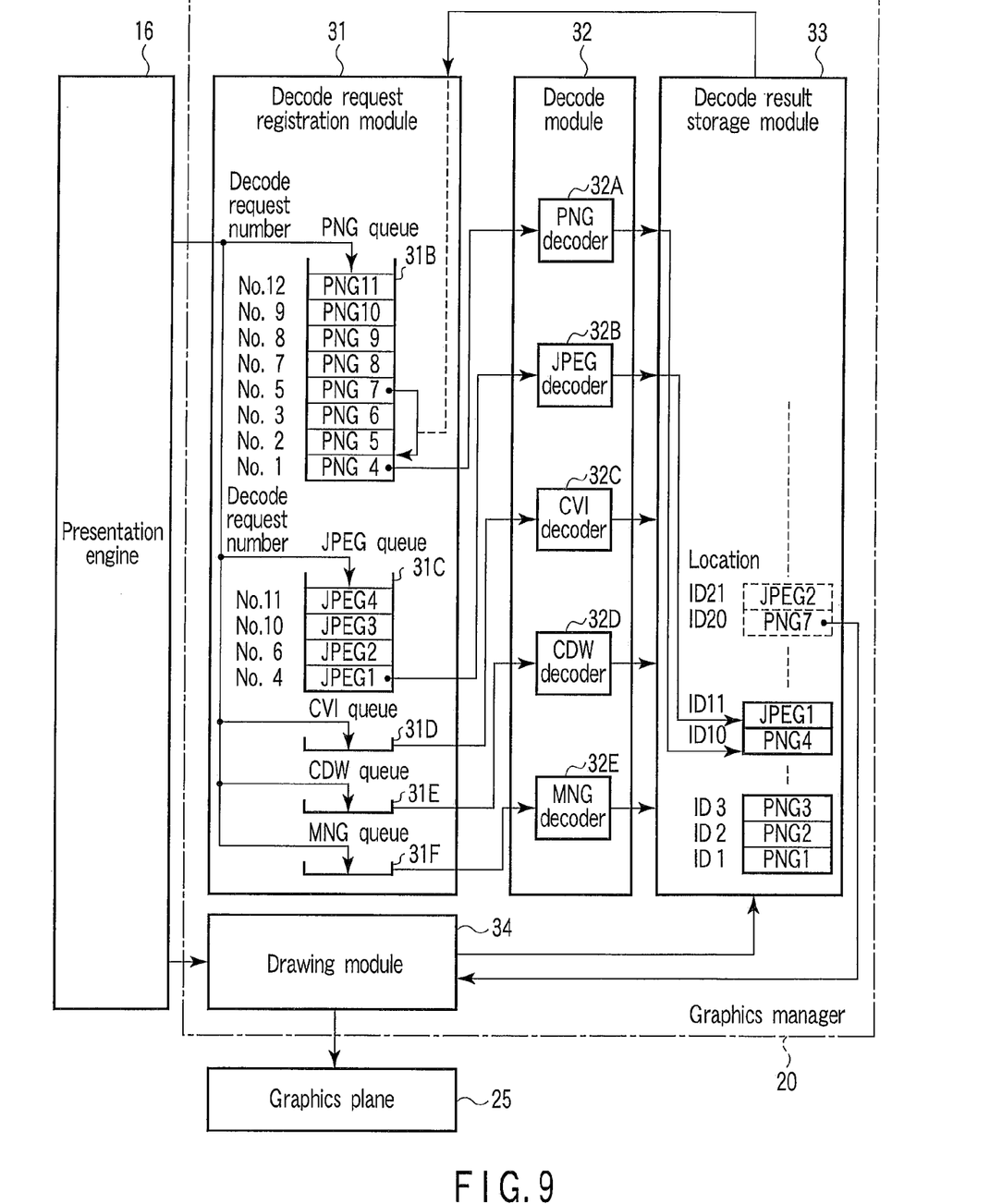
FIG. 9 is an exemplary diagram showing the configuration of a modification of the graphics manager shown in FIG. 2.

FIG. 9 shows the configuration of a modification of the graphics manager 20 shown in FIG. 2. This modification is constituted in the same manner as the above-described embodiment except matters described below. As shown in FIG. 9, the decode request registration module 31 includes a PNG queue 31B for registering decode requests for PNG image data items, a JPEG queue 31C for registering decode requests for JPEG image data items, a CVI queue 31D for registering decode requests for CVI image data items, a CDW queue 31E for registering decode requests for CDW image data items and a MNG queue 31F for registering decode requests for MNG image data items. As for the decode module 32, the PNG decoder 32A, the JPEG decoder 32B, the CVI decoder 32C, the CDW decoder 32D and the MNG decoder 32E are respectively connected to receive image data items of decode requests registered in the PNG queue 31B, the JPEG queue 31C, the CVI queue 31D, the CDW queue 31E and the MNG queue 31F in order to decode the image data items independently of one another.

Figure 10:
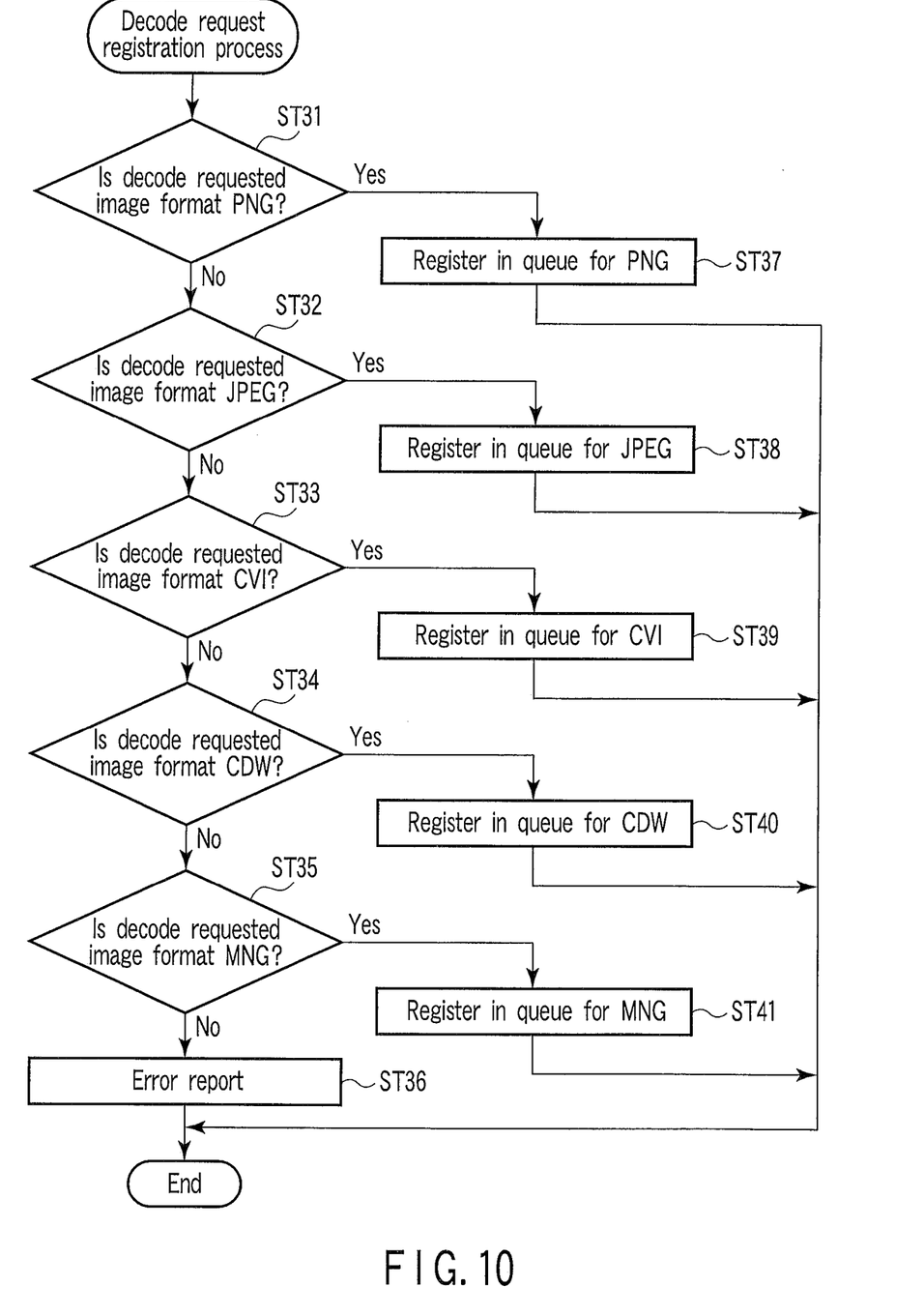
FIG. 10 is an exemplary diagram showing a decode request registration process of the decode request registration module of the modification shown in FIG. 9.

FIG. 10 shows a decode request registration process of the decode request registration module 31 of the modification. In this decode request registration process, it is checked in steps ST31-ST35 whether the decode requested image format is any one of PNG, JPEG, CVI, CDW and MNG, and if the format is not any one of them, an error report is issued in ST36. On the other hand, if the format is PNG, the decode request is registered in the PNG queue 31B in step ST37. If the format is JPEG, the decode request is registered in the JPEG queue 31C in step ST38. If the format is CVI, the decode request is registered in the CVI queue 31D in step ST39. If the format is CDW, the decode request is registered in the CDW queue 31E in step ST40. Further, if the format is NMG, the decode request is registered in the NMG queue 31C in step ST41. The above decode request registration process is made each time when a decode request for an image data item is issued from the presentation engine 16.

Figure 11:
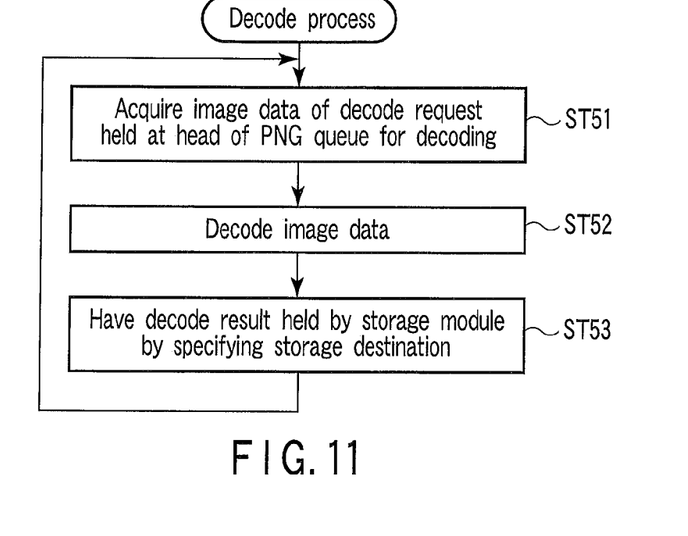
FIG. 11 is an exemplary diagram showing a decode process of the decode module according to the modification shown in FIG. 9.

FIG. 11 shows a decode process of the decode module 32 of the modification. This decode process is performed on image data of a decode request registered in each of the PNG queue 31B, the JPEG queue 31C, the CVI queue 31D, the CDW queue 31E and the MNG queue 31F. In the decode process of FIG. 11, the image data of the decode request registered in the PNG queue 31B is treated as a target. In this case, the decode module 32 acquires the image data of the decode request held at the head position in the PNG queue 31B for decoding in step ST51, decodes this image data in step ST52 and stores its decode result in the decode result storage module 33 by specifying a storage destination in step ST53. This decode process is repeated each time when the decode request is registered in the PNG queue 31B. In the decode process, the image data items of the decode requests registered in the JPEG queue 31C, the CVI queue 31D, the CDW queue 31E, and the MNG queue 31F are also treated as a target and processed in parallel.

Figure 12:
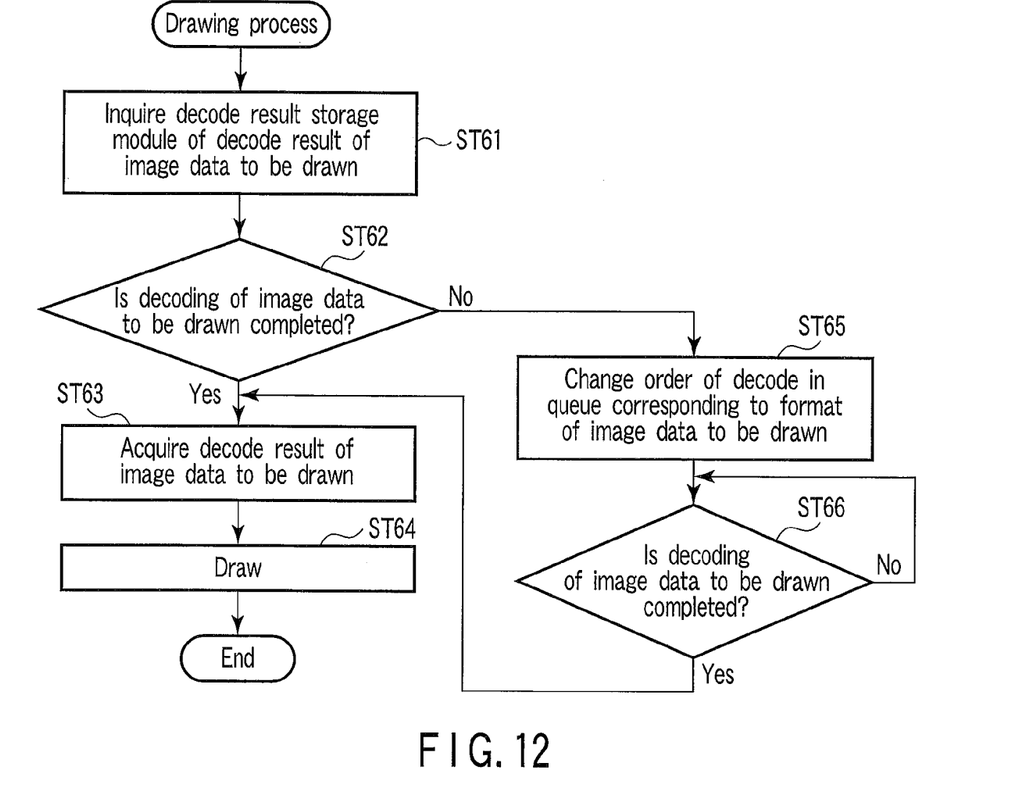
FIG. 12 is an exemplary diagram showing a drawing process of the drawing module 34 according to the modification shown in FIG. 9.

FIG. 12 shows a drawing process of the drawing module 34 of the modification. In this drawing process, the drawing module 34 inquires the decode result storage module 33 of a decode result of the image data to be drawn in step ST61 and checks in step ST62 whether decoding of the image data to be drawn has been completed. If it is confirmed that the decoding is completed, the drawing module 34 acquires the decode result in step ST63 and draws the decode result in step ST64. If it is confirmed in step ST62 that the decoding is not completed, the drawing module 34 changes the order of decoding in a queue corresponding to the format of the image data to be drawn by making the priority request in step ST65 and rechecks whether the decoding of the image data to be drawn is completed in step ST66. Step ST66 is repeated until the decoding is completed. That is, the drawing module 34 waits for the decoding to be completed by the repetition of step ST66. If it is confirmed that the decoding is completed, the drawing module 34 executes step ST63 to acquire this decode result. This drawing process is performed each time when a drawing request for an image data item is issued from the presentation engine 16.

In this modification, the PNG decoder 32A, the JPEG decoder 32B, the CVI decoder 32C, the CDW decoder 32D and the MNG decoder 32E operate in parallel so as to decode image data items of different image formats thereby reducing the entire decoding time.

Further, the decode request registration module 31 responds to registration of a decode request for an image data item and notifies the presentation engine 16 that the waiting state for the drawing request for the image data item has been established, to ensure that the preparation of the drawing request is performed in parallel with the decoding of the image data item. That is, before obtaining a decode result of an actual image data, the preparation of the drawing request can be started. Thus, the time from the start of the decoding of the image data item to be drawn to the completion of the drawing can be reduced effectively without a necessity of any complicated optimizing control.

Further, a specific image data item needs to be drawn on a priority basis, a drawing request for the image data is issued prior to drawing requests for other image data items already requested to be decoded and by moving up the registration place of the decode request for the image data item, a decode result of the specific image data item can be obtained without waiting for decoding of the other image data items requested to be decoded to be completed. Consequently, the time from the start of the decoding of the image data to be drawn on a priority basis to the completion of the drawing can be reduced effectively.

While certain embodiments of the inventions have been described, these embodiments have been presented by way of example only, and are not intended to limit the scope of the inventions. Indeed, the novel methods and systems described herein may be embodied in a variety of forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A graphics processing method comprising:
   registering decode requests for image data items sequentially;
   decoding and holding the image data items in a registration order of the decode requests;
   acquiring a decode result according to a drawing request issued for each image data item; and
   drawing the decoding result;
   wherein a drawing request source is notified that a waiting state for the image data drawing request has been established, in response to registration of the decode request for the image data item to ensure that the preparation of the drawing request for the image data item is performed in parallel with the decoding of the image data item.

2. The graphics processing method according to claim 1, wherein when decoding of a specific image data item performed in response to a decoding request for the image data item has not been completed, a registration place of the decode request for the specific image data item is moved up.

3. The graphics processing method according to claim 2, wherein the registration place is moved up to a top place.

4. The graphics processing method according to claim 1, wherein decode requests for image data items of different image formats are registered independently and the image data items are decoded in parallel between the different image formats and in the registration order for each image format.

5. A graphics processor comprising:
   a registering module which registers decode requests for image data items sequentially;

a decode processing module which decodes and holds the image data items in a registration order of the decode requests; and a drawing module which acquires a decode result from the decode processing module according to a drawing request issued for each image data item and drawing the decode result;

wherein the registering module is configured to notify a drawing request source that a waiting state for the drawing request for the image data item has been established, in response to registration of the decode request for the image data item to ensure that the preparation of the drawing request for the image data item is performed in parallel with the decoding of the image data item.

6. The graphics processor according to claim 5, wherein the decode processing module is configured such that when decoding of a specific image data item performed in response to a decoding request for the image data item has not been completed, a priority request for the specific image data is issued to the registering module, and the registering module is configured to move up a registration place of the decode request for the specific image data in response to the priority request.

7. The graphics processor according to claim 5, wherein the registering module is configured to register decode requests for image data items of different image formats independently, and the decode processing module is configured to decode the image data items in parallel between the different image formats and in the registration order for each image format.

8. A video reproducing apparatus comprising:

a presentation engine which makes decode and drawing requests for image data items, each drawing request being issued after a corresponding decode request is issued; and a graphics manager which registers the decode requests sequentially issued by the presentation engine, decoding and holding the image data items in a registration order of the decode requests and then drawing a decode result as a graphic object according to the drawing request issued for each image data item;

wherein the graphics manager notifies the presentation engine that a waiting state for a drawing request for the image data item has been established, in response to registration of the decode request for the image data item to ensure that the preparation of the drawing request for the image data item is performed in parallel with the decoding of the image data item.

9. The video reproducing apparatus according to claim 8, wherein the graphics manager is configured such that when decoding of a specific image data item performed in response to a decoding request for the image data item has not been completed, a registration place of the decode request for the specific image data is moved up.

10. The video reproducing apparatus according to claim 8, wherein the graphics manager is configured to register decode requests for image data items of different image formats independently and decode the image data items in parallel between the different image formats and in the registration order for each image format.

* * * * *